United States Patent [19]

Corompt

[11] 4,350,469
[45] Sep. 21, 1982

[54] HANDLING DEVICE MOUNTED ON A VEHICLE TO CARRY OUT THE HANDLING OF LOADS SUCH AS SKIPS AND CONTAINERS

[75] Inventor: Antoine Corompt, Saint Etienne, France

[73] Assignee: Bennes Marrel S.A., France

[21] Appl. No.: 160,295

[22] Filed: Jun. 17, 1980

[30] Foreign Application Priority Data

Jun. 18, 1979 [FR] France ............................... 79 16332

[51] Int. Cl.³ .............................................. B60P 1/64
[52] U.S. Cl. ...................... 414/420; 298/14; 298/19 B; 414/491; 414/498; 414/549; 414/556
[58] Field of Search ............... 414/420, 421, 498, 546, 414/547, 555, 491, 549, 556; 298/12, 14, 17.5, 19 B

[56] References Cited

U.S. PATENT DOCUMENTS 3,988,035 10/1976 Corompt .......................... 414/498 X
4,175,904 11/1979 Airaksinen ........................... 414/421

Primary Examiner—Robert G. Sheridan
Attorney, Agent, or Firm—Remy J. VanOphem

[57] ABSTRACT

The device comprises a derrick with a main telescopic arm and an auxiliary arm. The telescopic arm 9 is pivoted on a sub-frame which in turn is pivoted to the main chassis of the vehicle. At the front the main vehicle chassis 3 is mounted a cam having ramps 20 and 21 on which travels a roller mounted to the free end of the telescopic arm. In order to tip the load on the vehicle, the telescopic arm is first contracted, providing a slight upward swing of the arm when the roller 22 climbs the ramp 20. This appreciably relieves the load requirements of the tilting jack thereby enabling handling of larger loads.

10 Claims, 8 Drawing Figures

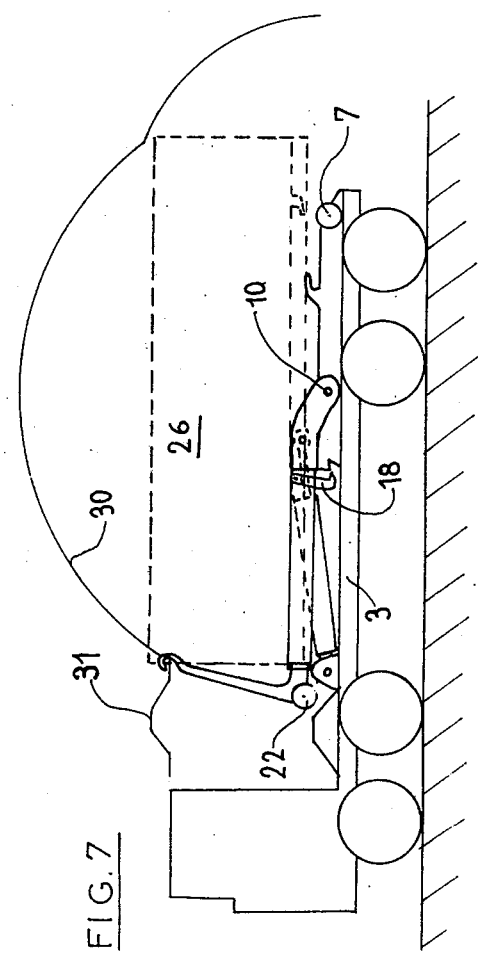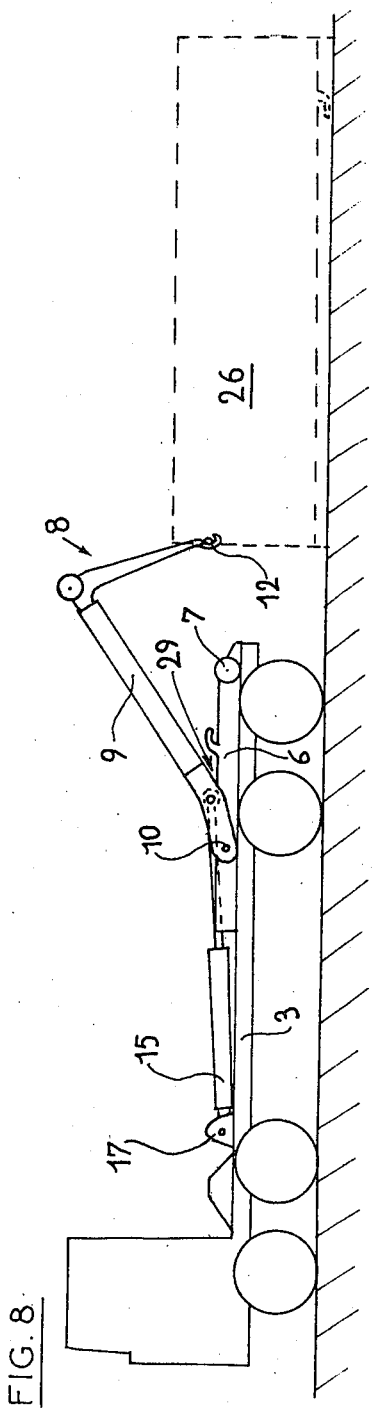

HANDLING DEVICE MOUNTED ON A VEHICLE TO CARRY OUT THE HANDLING OF LOADS SUCH AS SKIPS AND CONTAINERS

BACKGROUND OF THE INVENTION

1. Field of the Invention

The present invention concerns an improved handling device mounted on a vehicle to carry out the handling of containers, skips, and any other load liable to be carried by the vehicle, as well as the procedure for its use.

2. Description of the Prior Art

There are already known handling devices mounted on vehicles which comprise a derrick of which the main telescopic arm is pivoted to the free end of a sub-frame which is itself joined by a transverse pivot to the rear end of the vehicle chassis. The mechanism is controlled by a slide jack allowing the main arm of the derrick to be extended and contracted, and by a tilting jack which is pivoted between the main arm of the derrick and the front of the vehicle chassis to tip the derrick and the sub-frame backwards and forwards. When it is desired to unload a skip or any other load on the vehicle, the tilting jack is extended and the derrick first swings about the pivot on the sub-frame, and secondly about the pivot on the chassis. When it is desired to "tip", that is to say empty the skip by inclining it downwards and backwards without unloading it, the main arm of the derrick is latched to the sub-frame in such a way that the extension of the tipping jack makes the whole assembly comprising the skip, the derrick and the sub-frame swing around the pivot at the rear of the chassis. The latching device which secures the main arm of the derrick to the sub-frame is preferably operated automatically by a first movement of the slide jack.

A handling device of this type is, for example, described in U.S. Pat. No. 3,988,035, owned by the assignee of the present invention and incorporated by reference herein.

One of the disadvantages of such a handling device is that it necessitates the use of a very powerful, and hence very expensive, tilting jack. In fact, the load to handle is very heavy, as much as 20 tons, and at the beginning of tilting the jack must provide a great initial starting force, given that its lever arm is very short on account of the fact that the tilting jack is almost horizontal, the lever arm being the distance which separates the line of action of the said jack from the axis of swing of the load. In fact, even with an oversize tilting jack, such a device does not allow the utilisation of skips and containers of standard dimensions of more than 20 tons in weight.

SUMMARY OF THE INVENTION

The invention aims at achieving an improved handling device which will reduce the above disadvantage, and which therefore allows easy handling of even heavier loads.

A handling device according to the invention, mounted on a vehicle, to carry out the handling of loads such as skips and containers comprises:

a sub-frame joined by a first transverse pivot which is closely horizontal at the rear of the vehicle chassis;

a derrick comprising a main telescopic arm of which the base is pivoted to the free end of the sub-frame by means of a second pivot parallel to the first, and an auxiliary arm provided at its free end with a hook intended to work in conjunction with an anchor point provided at the front of the load;

at least one tilting jack pivoted at the rear to the main derrick arm and at the front to the chassis of the vehicle to control the tipping movements of the derrick;

a side jack which controls the extension and contraction of the main telescopic derrick arm;

a latching system which ensures the locking of the main derrick arm in line with the sub-frame by means of an extension of the said main arm.

The invention is characterised, in that, the front of the chassis is provided with a ramp intended to work in conjunction with the free end of the main telescopic derrick arm to make the derrick tip slightly upwards from the road position of the device at the beginning of the contraction movement of the main arm.

According to an additional characteristic of the invention, the first ramp is followed towards the rear by a second ramp due to which the derrick tips downwards when the contraction of the main telescopic arm continues. The derrick being thus completely lowered when the automatic locking of the latching system takes place.

According to an additional characteristic of the invention, the free end of the main telescopic derrick arm is provided with a bearing roller by means of which this main arm comes into contact with the ramps, the roller running on these ramps.

According to another characteristic of the invention, a movement detector is placed between the two ramps to work in conjunction with the bearing roller of the main telescopic arm when it is located there.

According to an additional characteristic of the invention, a decompression device is connected in the feed circuit of the tipping jack, this device being operated by means of a sensor which is acted upon when the main derrick arm is in the low position, or near to that position.

According to an additional characteristic of the invention, the sensor of the decompression device is fitted to work in conjunction with the pivot spindle connecting the tilting jack to the main derrick arm, the said spindle pushing the control pedal of the sensor slightly forward so long as the main derrick arm is near to its low position.

A procedure for using the handling device according to the invention is characterised in that one proceeds in the following manner in order to carry out a tilting operation:

With the handling device initially in the road position, first, the main telescopic derrick arm is contracted by means of the slide jack.

The contraction movement is stopped as soon as the movement detector registers the presence of the bearing roller between the two ramps.

The assembly comprising the derrick, the sub-frame and the load is then tipped by means of the tilting jack.

A procedure for using the handling device according to the invention is characterised in that one proceeds in the following manner to unload the load:

With the handling device initially in the road position, the telescopic derrick arm is contracted by means of the slide jack in such a way that the bearing roller of the main derrick arm rides up the first ramp, down the second ramp until the latching system is unlocked.

The tilting jack is then operated in such a way as to make the derrick swing first about the second pivot, then about the first pivot.

BRIEF DESCRIPTION OF THE DRAWINGS

The attached drawings, given by way of non-limiting example, will allow the characteristics of the invention to be better understood.

FIG. 7 is a side view of the device at the beginning of an operation for unloading the load.

FIG. 8 is a side view of the device during the operation of unloading the load.

DETAILED DESCRIPTION OF THE PREFERRED EMBODIMENT

Figures 1, 2:
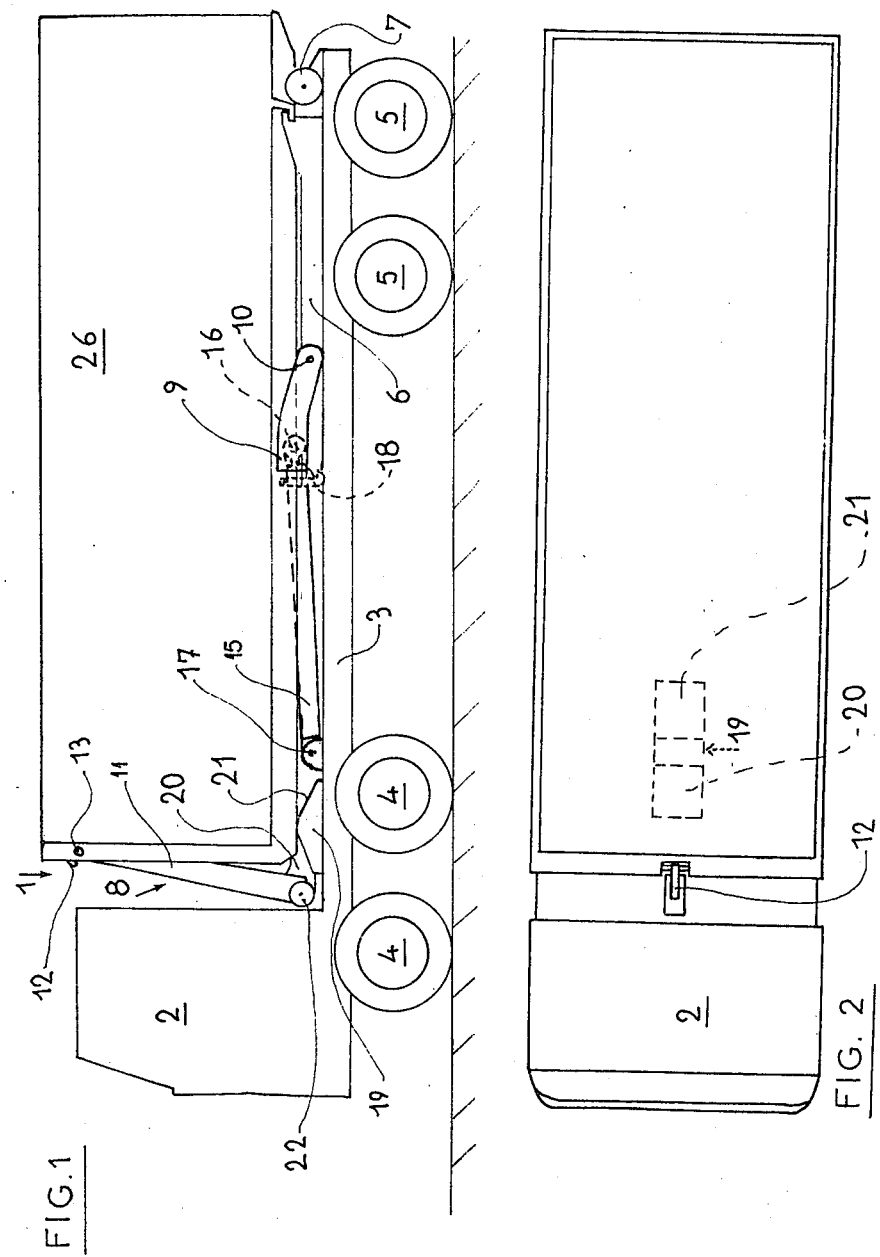
FIG. 1 is a side view of an improved handling device according to the invention mounted on a vehicle, in the road position.
FIG. 2 is a plan view of the same vehicle.

In the drawings is shown a vehicle 1 provided with a driving cab 2 and a chassis 3. This vehicle carries two front axles 4 and two rear axles 5. A sub-frame 6 is mounted so as to swing about a pivot 7 located at the rear end of the chassis 3. The pivot 7, which is closely horizontal, lies transversely in relation to the vehicle. A derrick 8 can pivot in relation to the sub-frame 6. This derrick comprises a main arm 9 of which the base is connected to the free end of the sub-frame 6 by means of a pivot 10 parallel to the pivot 7, and an auxiliary arm 11 provided at its free end with a hook 12 intended to work in conjunction with a hooking point 13 provided at the front of the load. The main arm 9 is telescopic, and lug use of the slide jack 14, provides control for the extension and contraction of the main arm. The tilting jack 15, is pivoted at the rear end to the main derrick arm by means of a spindle 16 and, at the front, to the chassis 3 by means of a spindle 17, the arrangement of the slide jack 14 and tilting jack 15 is clearly shown in FIG. 6. A latching component 18 is in addition provided to lock the main derrick arm 9 in line with the sub-frame 6. Following a known arrangement, the unlocking of this mechanism takes place automatically when the main derrick arm 9 is completely contracted.

Figure 3:
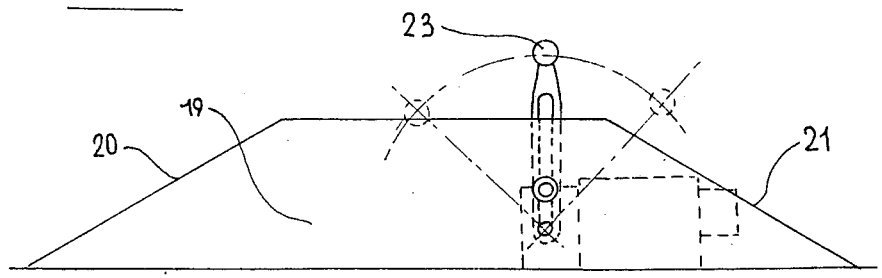
FIGS. 3 and 4 are partial views, on a larger scale, of FIG. 1.
Figure 4:
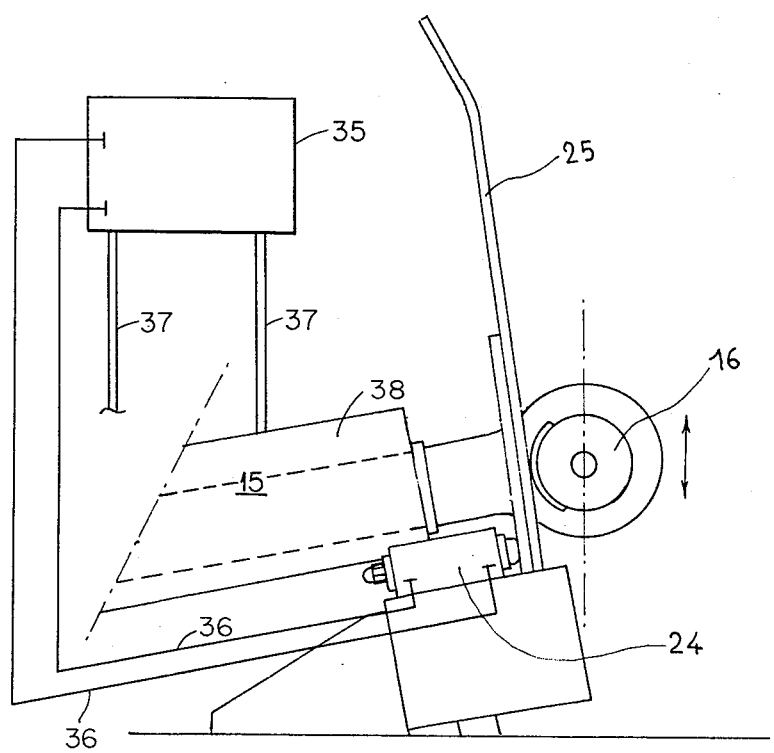

According to an arrangement peculiar to the invention, the front of the chassis 3 is provided with a cam 19 comprising a front ramp 20 sloping forwards and downwards, and a rear ramp 21 sloping backwards and downwards, whilst the free end of the main arm 9 is fitted with a bearing roller 22 by means of which the arm comes into contact with the cam 19, the roller 22 running on the ramps. A movement detector 23, shown in FIG. 3, is placed between the ramps 20 and 21 to work in conjunction with the roller 22 when it is located there.

On the other hand, a decompression device 35 connected in the feed circuit 37 of the annular pressure chamber 38 of the tilting jack 15 is operated by means of a sensor 24 which is activated 36 when the main derrick arm is in the low position or near to this position. For this purpose the sensor 24 carries a control pedal 25 which the spindle 16 pushes slightly forward when the derrick 8 is near to its low position.

To carry out a tilting operation one proceeds in the following manner:

With the handling device in the road position shown in FIG. 1. the main arm 9 of the derrick 8 is first slightly contracted by means of the slide jack 14. During this phase, the roller 22 rides up the ramp 20 causing a start of upward pivoting around the pivot 7 of the assembly comprising the derrick 8, the sub-frame 6 and the load 26.

Figures 5, 6:
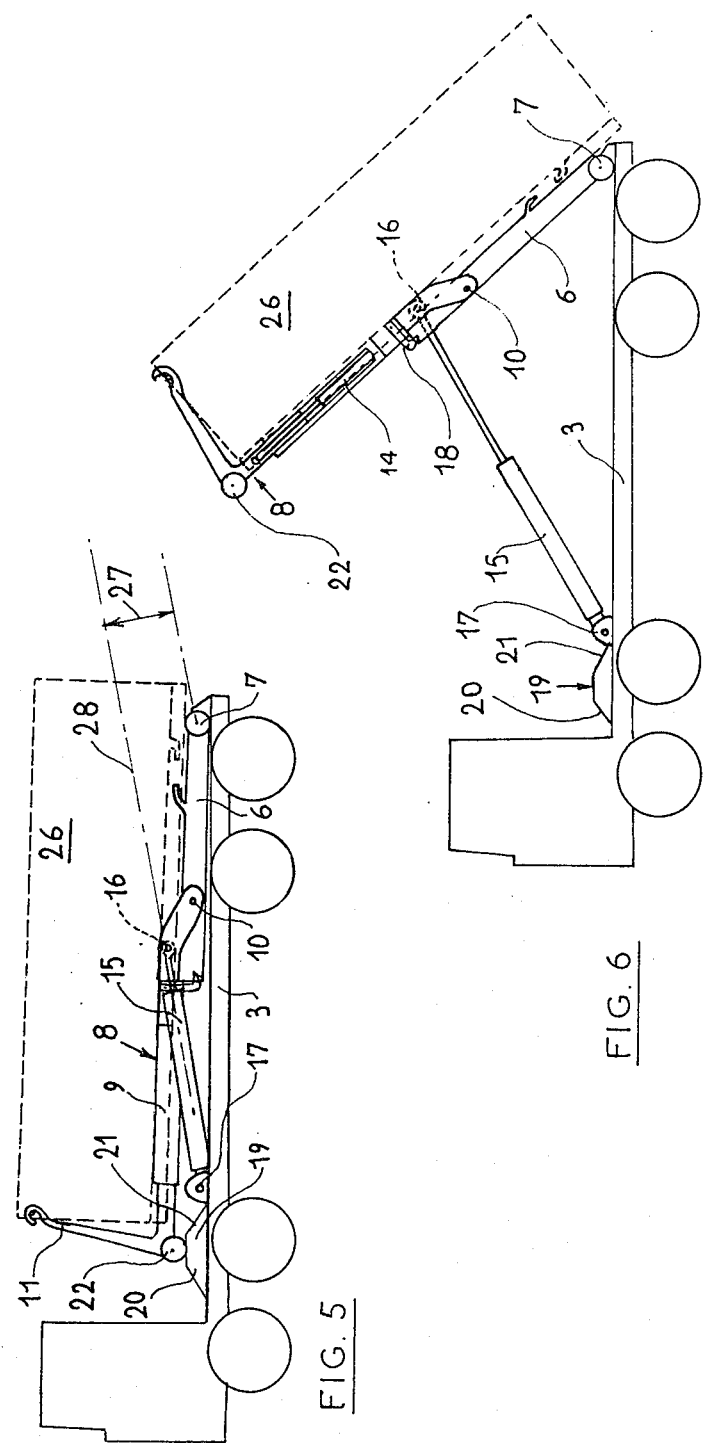
FIG. 5 is a side view of the device at the beginning of tilting.
FIG. 6 is a side view of the device during tilting.

As soon as the movement detector 23 registers the presence of the bearing roller 22 between the two ramps 20 and 21, the contraction of the main arm 9 is stopped, FIG. 5 illustrates this position.

The tilting jack 15 is then extended, making the movable assembly comprising the derrick 8, the sub-frame 6 and the load 26 swing as a unit backwards about the pivot 7, FIG. 6 illustrates the tilting operation.

The initial pivoting of the movable assembly mentioned above is made possible by a decompression of the annular chamber 38 of the tilting jack 15 controlled by the sensor 24.

The initial action of the slide jack 14 is of great advantage, for the following two reasons:

firstly, given that the load moves backwards, the resisting lever arm of the load to be pivoted about the pivot 7 is appreciably reduced.

secondly, given that the load is raised by the effect of the ramp 20, the operating lever arm of the tilting jack 15 increases even before the tilting jack 15 is operated. As can be seen in FIG. 5, this lever arm is, in the case of a tilting operation, the distance 27 which separates the line of action 28 of the tilting jack 15 from the axis of the pivot 7.

In order to deposit the load 26 on the ground, one proceeds in the following manner:

With the handling device initially in the road position shown in FIG. 1, the main arm 9 of the derrick 8 is contracted by means of the slide jack 14. As previously described, the roller 22 first rides up the ramp 20, causing an upward pivoting of the movable assembly mentioned above about the pivot 7. The roller 22 then descends the ramp 21, which allows the movable assembly to bear once more on the chassis 3.

After the roller 22 has descended the ramp 21, the main derrick arm 9 reaches the limit of its contraction and causes the automatic unlocking of the latching component 18 as shown in FIG. 7.

Finally, the tilting jack 15 extends, making the derrick 8 swing respectively around the pivot 10, then around the pivot 7.

The swing around the pivot 7 commences when the base of the derrick comes into contact at 29 with the sub-frame 6 (FIG. 8).

The setting down of the load 26 on the ground therefore is carried out in an entirely traditional way known in the art. The modifications which the present application brings to the handling device changing nothing in the procedure of loading and unloading loads. The line 30 in FIG. 7 represents the path followed by the free end of the derrick 8 during the operations of loading and unloading. This path retains the traditional shape except near to the road position where the ramps 20 and 21 cause a hump 31.

Having described the invention, what is claimed is:

1. A handling device mounted on a vehicle to carry out the handling of loads such as skips and containers, comprising:

a sub-frame pivoted on a first transverse pivot, which is closely horizontal, provided at the rear of the chassis of the vehicle;

a derrick comprising a main telescopic arm of which the base is pivoted to the free end of the sub-frame by means of a second pivot parallel to the first pivot, and an auxiliary arm provided at its free end with a hook intended to work in conjunction with an anchor point provided at the front of the load;

at least one tilting jack pivoted at the rear to the main arm of the derrick, and at the front to the chassis of the vehicle to control the swinging movements of the derrick;

a slide jack which controls the extension and contraction of the main telescopic arm of the derrick;

a latching system able to ensure the latching of the main derrick arm in line with the sub-frame, and characterised in that the chassis is provided at the front with a cam intended to work in conjunction with the free end of the main telescopic derrick arm to make the derrick swing slightly upwards at the beginning of the contraction travel of the said main arm from the road position of the device.

2. A handling device according to claim 1, wherein the cam comprises a front ramp sloping upwards and backwards, and a rear ramp sloping downwards and backwards, the cam being placed in such a way that the main telescopic arm is situated clear of the cam when it is sufficiently contracted to cause the automatic unlocking of the latching system.

3. A handling device according to claim 2 wherein, the free end of the main telescopic derrick arm is provided with a bearing roller by means of which this main arm runs on the ramps of the cam.

4. A handling device according to claims claim 2 further comprising a movement detector placed between the two ramps to work in conjunction with the bearing roller of the main telescopic arm when it is located there.

5. A handling device according to claim 2 further comprising in that a decompression device is connected in the feed circuit of the annular chamber of the tilting jack, this decompression device being operated by means of a sensor which is activated when the main derrick arm is in the low position or near to it.

6. A handling device according to claim 5, wherein the sensor of the decompression device is mounted to work in conjunction with the pivot spindle connecting the tilting jack to the main arm, the said spindle pushing the control pedal of the sensor slightly forwards so long as the main derrick arm is near to its low position.

7. A handling device adapted to carry loads such as skips and containers, said device being mounted to a vehicle chassis and comprising:

a subchassis pivotably mounted to said chassis of the vehicle, said subchassis having a free end; first means for pivoting said subchassis, said pivoting means interposed said vehicle chassis and subchassis, and second means for pivoting located in said free end;

a derrick member mounted to said free end of the subchassis, said derrick comprising a main telescopic arm having a base attached to said second means for pivoting, said second means for pivoting further being parallel to said first means for pivoting, said derrick further having an auxiliary arm with a hook member at one end, said hook member adapted to engage the load to be carried, and means for rolling attached to said main telescopic arm;

at least one tilting jack having one end attached to said second means for pivoting and an opposite end attached to the vehicle chassis, said tilting jack pivoting said derrick about said first means for pivoting;

at least one slide jack mounted within said main telescopic arm whereby said slide jack operates said main telescopic arm from a fully extended to a fully contracted position;

means for latching said derrick to said subchassis; and camming means mounted to said vehicle chassis juxtaposes said means for rolling attached to said main telescopic arm; said camming means providing upward movement of said main telescopic arm of the derrick upon actuation of said slide jack from a fully extended position to a fully contracted position.

8. The device as described in claim 7 wherein said camming means further comprises:

an upward sloping ramp;

a dwell ramp immediately adjacent said upward sloping ramp;

a downward sloping ramp opposite said upwards sloping ramp and adjacent said dwell ramp; and means for latching said derrick member to said vehicle chassis such that when said derrick member travels in a first predetermined direction in direct contact with said upward sloping dwell and downward sloping ramps to unload such load, said latching means latches the derrick member to the vehicle chassis and such that when said derrick member travels in said first predetermined direction beyond said downward sloping ramp away from said ramp said latching means unlatches the load from said vehicle chassis.

9. The device as claimed in claim 8 further comprising means for detecting the movement of said rolling means relative to said camming means.

10. The device as claimed in claim 7 further comprising means for sensing the position of said tilting jack when said tilting jack is in a fully contracted position.

* * * * *

UNITED STATES PATENT AND TRADEMARK OFFICE
CERTIFICATE OF CORRECTION

PATENT NO. : 4,350,469

DATED : September 21, 1982

INVENTOR(S) : Antoine Corompt

It is certified that error appears in the above-identified patent and that said Letters Patent is hereby corrected as shown below:

In The Abstract

Line 1, delete "comprise" and insert ---includes---.

Line 2, delete the reference character "9".

Line 5, delete the reference characters "3, 20, and 21".

After the word "mounted" insert "to".

Line 9, delete the reference character "22".

Line 10, delete the reference character "20".

Column 1, line 16, delete "comprise" and insert ---includes--.

Column 1, line 33, delete "comprising" and insert --- including ---.

Column 1, line 50, delete "said".

Column 1, line 52, delete "utilisation" and insert --- utilization ---.

Column 1, line 62, delete "comprises" and insert --- includes ---.

UNITED STATES PATENT AND TRADEMARK OFFICE
CERTIFICATE OF CORRECTION

PATENT NO. : 4,350,469
DATED : September 21, 1982
INVENTOR(S) : Antoine Corompt

It is certified that error appears in the above-identified patent and that said Letters Patent is hereby corrected as shown below:

Column 1, line 65, delete "comprising" and insert --- including ---. Same line, delete "of which".

Column 1, line 66, after the word "base" insert --- of which ---.

Column 2, line 6, delete "side" and insert --- slide ---.

Column 2, line 8, delete "ensures" and insert --- insures ---.

Column 2, line 10, delete "said".

Column 2, line 11, delete "characterised" and insert --- characterized ---.

Column 2, line 14, delete "upwards" and insert --- upward ---.

Column 2, line 19, delete "downwards" and insert --- downward ---.

Column 2, line 42, delete "said".

Column 2, line 47, delete "characterised" and insert --- characterized ---.

Column 2, line 56, delete "comprising" and insert --including--.

Column 2, line 59, delete "characterised" and insert --- characterized ---.

UNITED STATES PATENT AND TRADEMARK OFFICE
CERTIFICATE OF CORRECTION

PATENT NO. : 4,350,469
DATED : September 21, 1982
INVENTOR(S) : Antoine Corompt

It is certified that error appears in the above-identified patent and that said Letters Patent is hereby corrected as shown below:

Column 3, line 29, delete "comprises" and insert --- includes ---. Same line, delete "of which". Same line, after "base" insert --- of which ---.

Column 3, line 31, after "of a" insert --- second ---. Same line, after "the" insert --- first transverse ---.

Column 3, line 48, delete "comprising" and insert --- which includes ---. Same line, delete "sloping forwards and downwards" and insert --- which slopes forward and downwardly ---.

Column 3, line 49, delete "sloping backwards and".

Column 3, line 50, delete "downwards, whilst" and insert --- which slopes backward and downwardly, while ---.

Column 3, line 52, before "the" second occurrence insert --- and ---. Same line, after "the" second occurrence insert --- bearing ---.

Column 3, line 55, after "the" insert --- bearing ---.

Column 4, line 2, before "roller" insert --- bearing ---. Same line, before the word "ramp" insert --- front ---.

UNITED STATES PATENT AND TRADEMARK OFFICE
CERTIFICATE OF CORRECTION

PATENT NO. : 4,350,469
DATED : September 21, 1982
INVENTOR(S) : Antoine Corompt

It is certified that error appears in the above-identified patent and that said Letters Patent is hereby corrected as shown below:

Column 4, line 3, before "pivot" insert --- first transverse ---.

Column 4, line 4, delete "comprising" and insert --- which includes ---.

Column 4, line 11, delete "comprising" and insert --- including ---.

Column 4, line 13, before "pivot" insert --- first transverse ---.

Column 4, line 16, after "chamber" insert --- pressure ---.

Column 4, line 22, before "pivot" insert --- first transverse ---.

Column 4, line 24, before "ramp" insert --- front ---.

Column 4, line 29, before "pivot" insert --- first transverse ---.

Column 4, line 35, before "roller" insert --- bearing ---. Same line, before "ramp" insert --- front ---.

Column 4, line 37, before "pivot" insert --- first transverse ---. Same line, before "roller" insert --- bearing ---.

Column 4, line 38, before "ramp" insert --- rear ---.

Column 4, line 40, before "roller" insert --- bearing ---. Same line, before "ramp" insert --- rear ---.

UNITED STATES PATENT AND TRADEMARK OFFICE
CERTIFICATE OF CORRECTION

PATENT NO. : 4,350,469

DATED : September 21, 1982

INVENTOR(S) : Antoine Corompt

Page 5 of 9

It is certified that error appears in the above-identified patent and that said Letters Patent is hereby corrected as shown below:

Column 4, line 45, before "pivot" insert --- first transverse ---. Same line, delete "10" and insert --- 7 ---.

Column 4, line 46, delete "pivot 7" and insert --- second pivot 10 ---.

Column 4, line 47, before "pivot" insert --- first transverse ---.

In The Claims

Claim 1, column 4, line 66, delete "the" and insert --- said ---.

Claim 1, column 4, line 68, delete "the" third occurrence and insert --- said ---.

Claim 1, column 5, line 1, delete "the" and insert --- said ---.

Claim 1, column 5, line 2, before "pivot" insert --- transverse ---.

Claim 1, column 5, line 5, delete "the" second occurrence and insert --- said ---.

Claim 1, column 5, line 6, delete "the" third occurrence and insert --- said ---.

Claim 1, column 5, line 7, delete "the" first occurrence and insert --- said ---.

UNITED STATES PATENT AND TRADEMARK OFFICE
CERTIFICATE OF CORRECTION

PATENT NO. : 4,350,469
DATED : September 21, 1982
INVENTOR(S) : Antoine Corompt

It is certified that error appears in the above-identified patent and that said Letters Patent is hereby corrected as shown below:

Claim 1, column 5, line 8, delete "the" and insert --- said ---.

Claim 1, column 5, line 10, delete "the" first and second occurrence and insert --- said ---.

Claim 1, column 5, line 11, delete "ensure" and insert --- insure ---. Same line delete "the" second occurrence and insert --- said ---.

Claim 1, column 5, line 12, delete "the" and insert --- said ---.

Claim 1, column 5, line 13, delete "characterised" and insert --- characterized ---. Same line, delete "the" first and second occurrence and insert --- said ---.

Claim 1, column 5, line 15, delete "the" first and second occurrence and insert --- said ---.

Claim 1, column 5, line 16, delete "the" and insert --- said ---.

Claim 1, column 5, line 17, delete "the" third occurrence.

Claim 2, column 5, line 20, delete "the" and insert --- said ---.

Claim 2, column 5, line 22, delete "the" first and second occurrence and insert --- said ---.

UNITED STATES PATENT AND TRADEMARK OFFICE
CERTIFICATE OF CORRECTION

PATENT NO. : 4,350,469
DATED : September 21, 1982
INVENTOR(S) : Antoine Corompt

It is certified that error appears in the above-identified patent and that said Letters Patent is hereby corrected as shown below:

Claim 2, column 5, line 23, delete "the" and insert --- said ---.
Claim 2, column 5, line 25, delete "the" and insert --- said ---.
Claim 3, column 5, line 27, delete "the" first and second occurence and insert --- said ---.

Claim 3, column 5, line 30, delete "the" first and second occurence and insert --- said ---.

Claim 4, column 5, line 31, delete "claims claim 2" and insert --- calim 3 ---.

Claim 5, column 5, line 37, delete "in that". Same line, delete "is".

Claim 5, column 5, line 39, delete "this" and insert --- said ---.

Claim 5, column 5, line 40, delete "the" and insert --- said ---.

Claim 6, column 5, line 43, delete "the" first and second occurrence and insert --- said ---.

Claim 6, column 5, line 45, delete "the" second occurrence and insert said. Same line, delete "the" third occurrence.

UNITED STATES PATENT AND TRADEMARK OFFICE
CERTIFICATE OF CORRECTION

PATENT NO. : 4,350,469

DATED : September 21, 1982

INVENTOR(S) : Antoine Corompt

It is certified that error appears in the above-identified patent and that said Letters Patent is hereby corrected as shown below:

Claim 6, column 5, line 46, delete "the" second occurrence and insert --- said ---. Same line, delete "forwards" and insert --- forward ---.

Claim 6, column 5, line 47, delete "the" and insert --- said ---. Same line, delete "to".

Claim 7, column 5, line 51, delete "the" and insert --- said ---.

Claim 7, column 6, line 3, delete "the" and insert --- said ---.

Claim 7, column 6, line 15, delete "the" and insert --- said ---.

UNITED STATES PATENT AND TRADEMARK OFFICE
CERTIFICATE OF CORRECTION

PATENT NO. : 4,350,469

DATED : September 21, 1982

INVENTOR(S) : Antoine Corompt

It is certified that error appears in the above-identified patent and that said Letters Patent is hereby corrected as shown below:

Claim 7, column 6, line 23, delete "jux-".

Claim 7, column 6, line 24, delete "taposes" and insert --- juxtaposed ---.

Claim 7, column 6, line 27, delete "the" and insert --- said ---.

Claim 8, column 6, line 42, delete "the" second occurrence and insert --- said ---.

Signed and Sealed this

Tenth Day of January 1984

[SEAL]

Attest:

GERALD J. MOSSINGHOFF

Attesting Officer

Commissioner of Patents and Trademarks